US010454855B2

(12) United States Patent
Rife

(10) Patent No.: US 10,454,855 B2
(45) Date of Patent: Oct. 22, 2019

(54) SYSTEM AND METHOD FOR PREDICTING AVAILABILITY STATUS CHANGES OF INSTANT MESSENGER USERS

(71) Applicant: Interactive Intelligence Group, Inc., Indianapolis, IN (US)

(72) Inventor: Randolph Rife, Indianapolis, IN (US)

(*) Notice: Subject to any disclaimer, the term of this patent is extended or adjusted under 35 U.S.C. 154(b) by 203 days.

(21) Appl. No.: 15/477,698

(22) Filed: Apr. 3, 2017

(65) Prior Publication Data
US 2017/0289076 A1  Oct. 5, 2017

Related U.S. Application Data

(60) Provisional application No. 62/316,712, filed on Apr. 1, 2016.

(51) Int. Cl.
*H04L 12/58* (2006.01)
*H04L 29/08* (2006.01)

(52) U.S. Cl.
CPC ............ *H04L 51/043* (2013.01); *H04L 67/20* (2013.01); *H04L 67/24* (2013.01); *H04L 51/32* (2013.01)

(58) Field of Classification Search
CPC ....... H04L 51/043; H04L 51/32; H04L 67/20; H04L 67/24
See application file for complete search history.

(56) References Cited

U.S. PATENT DOCUMENTS

| | | |
|---|---|---|
| 8,229,079 B2 | 7/2012 | Tibbits |
| 9,053,307 B1 | 6/2015 | Johansson et al. |
| 9,060,050 B1 | 6/2015 | Chau et al. |
| 9,094,786 B2 | 7/2015 | Wohlert et al. |
| 9,191,788 B2 | 11/2015 | Somekh et al. |
| 9,374,434 B2* | 6/2016 | Sylvain ............. H04M 3/42374 |
| 9,942,400 B2* | 4/2018 | Conway ............... H04M 3/5175 |
| 10,178,056 B2* | 1/2019 | Cunico ................. H04L 51/043 |
| 2002/0186257 A1* | 12/2002 | Cadiz .................. G06F 16/9535 715/838 |
| 2007/0143433 A1* | 6/2007 | Daigle .................... H04L 67/24 709/207 |
| 2008/0162632 A1* | 7/2008 | O'Sullivan ............. H04L 51/04 709/204 |

(Continued)

OTHER PUBLICATIONS

International Searching Authority, International Search Report for PCT/US2017/025753, dated Jun. 26, 2017.

(Continued)

*Primary Examiner* — Mohamed A. Wasel

(57) ABSTRACT

A method for predicting availability status changes includes: retrieving, via a provider computing device, present availability status information for a user of an instant messenger (IM) application managed by the provider computing device, wherein the present availability status information includes at least a present availability status and a timestamp useable to identify a present date and time the present availability status was retrieved; identifying, by the provider computing device, a behavioral pattern of a plurality of behavioral patterns for the user as a function of the present availability status; determining, by the provider computing device, a predicted availability status change event; and creating, by the provider computing device, a predicted availability status string based on the identified behavioral pattern.

24 Claims, 4 Drawing Sheets

(56) References Cited

U.S. PATENT DOCUMENTS

| | | | | |
|---|---|---|---|---|
| 2008/0299948 A1* | 12/2008 | Rosener | .............. | H04M 1/6066 |
| | | | | 455/412.2 |
| 2009/0150217 A1* | 6/2009 | Luff | ....................... | G06Q 30/02 |
| | | | | 705/7.32 |
| 2009/0261157 A1* | 10/2009 | Kumar | ................... | G06Q 10/10 |
| | | | | 235/375 |
| 2014/0081652 A1 | 3/2014 | Klindworth | | |
| 2016/0337519 A1* | 11/2016 | Conway | .............. | H04M 3/5175 |

OTHER PUBLICATIONS

International Searching Authority, Written Opinion of the International Searching Authority for PCT/US2017/025753, dated Jun. 26, 2017.

* cited by examiner

SYSTEM AND METHOD FOR PREDICTING AVAILABILITY STATUS CHANGES OF INSTANT MESSENGER USERS

CROSS REFERENCE TO RELATED APPLICATIONS

The present application is related to, and claims the priority benefit of, U.S. Provisional Patent Application Ser. No. 62/316,712 filed Apr. 1, 2016, the contents of which are hereby incorporated in their entirety into the present disclosure.

BACKGROUND OF THE DISCLOSED EMBODIMENTS

Instant messaging (IM) applications have become ubiquitous tools for communicating. Historically, consumer-facing IM applications such as ICQ and AOL's Instant Messenger rose to prominence as a way for two or more parties to communicate via text in real time over the Internet. As texting and social networking applications grew in popularity, the more traditional IM applications lost favor, but other IM services became embedded into the social networking applications and/or were developed as standalone smartphone applications. More recently, IM applications have made their way into the enterprise as a supplement to, or in some cases a replacement of, email in the workplace.

Traditionally, the IM services are controlled by their corresponding provider companies and tend to follow the client-server model (i.e., all IM clients have to first connect to the central server). As such, the features of the different IM services are bound to the associated provider; however, certain features are more often than not incorporated into every IM service. One such feature is an availability status, commonly referred to as a presence status in some IM services. Typically, the availability status is displayed near a username associated with each user account's friendly name, and is usable to indicate one's availability at a given point in time.

For example, if a user is in a meeting, they can set their availability status to "In a Meeting." Similarly, if a user is off work (e.g., over the weekend, on a holiday, etc.), the user can set their availability status to "Unavailable." However, present technologies only display a current availability status, which may not allow another user to anticipate how long the user will maintain their current availability status. Accordingly, there exists a need for improvements in technologies for predicting availability status changes.

SUMMARY OF THE DISCLOSED EMBODIMENTS

In one aspect, a method for predicting availability status changes includes retrieving, via a provider computing device, present availability status information for a user of an instant messenger (IM) application managed by the provider computing device, wherein the a present availability status information includes at least a present availability status and a timestamp usable to identify a present date and time the present availability status was retrieved; identifying, by the provider computing device, a behavioral pattern of a plurality of behavioral patterns for the user as a function of the present availability status; determining, by the provider computing device, a predicted availability status change event; and creating, by the provider computing device, a predicted availability status string based on the identified behavioral pattern.

In some embodiments, the method further includes retrieving, by the provider computing device, one or more present data references, wherein identifying the behavioral pattern comprises comparing the present availability status and one or more of the present data elements to a corresponding availability status and data elements of the behavioral pattern. Additionally or alternatively, some embodiments, the method further includes updating, by the provider computing device, the present availability status in the IM application to the predicted availability status string. In some embodiments, creating the predicted availability status string comprises (i) determining a predicted availability status, (ii) determining a predicted availability status update time, and (iii) concatenating text corresponding to the predicted availability status and the predicted availability status update time to form the predicted availability status string.

In some embodiments, the method further includes receiving, by the provider computing device, an availability status update, wherein the availability status update indicates an availability status change by the user and includes availability status information; and creating, by the provider computing device, a behavioral pattern as a function of at least a portion of the availability status information, wherein the behavioral pattern includes at least a portion of the availability status information. Additionally or alternatively, in some embodiments, the method includes assigning, by the provider computing device, a confidence level of the behavioral pattern.

In some embodiments, the method further includes assigning the confidence level comprises assigning the confidence level as a function of a weighted value associated with one or more data elements of the availability status information. In other embodiments, the availability status information includes a present availability status, a timestamp usable to identify a date and time the availability status update was performed by the user.

In some embodiments, the method further includes retrieving, by the provider computing device, one or more $3^{rd}$ party references, wherein creating the behavioral pattern further comprises creating the behavioral pattern as a function of the one or more $3^{rd}$ party references. In some embodiments, retrieving the one or more $3^{rd}$ party references comprises retrieving the one or more $3^{rd}$ party references from at least one of a $3^{rd}$ party data aggregator, a local hardware resource of the provider computing device, or a software application of the provider computing device.

In some embodiments, the method further includes retrieving, by the provider computing device, one or more $3^{rd}$ party references, wherein identifying the behavioral pattern of a plurality of behavioral patterns for the user further comprises identifying the behavioral pattern as a function of at least one of the one or more $3^{rd}$ party references. In some embodiments, retrieving the one or more $3^{rd}$ party references comprises retrieving the one or more $3^{rd}$ party references from at least one of a $3^{rd}$ party data aggregator, a local hardware resource of the provider computing device, or a software application of the provider computing device.

In another aspect, a provider computing device for predicting availability status changes includes one or more computer-readable medium comprising instructions; and one or more processors coupled with the one or more computer-readable medium and configured to execute the instructions to retrieve a present availability status information for a user of an instant messenger (IM) application managed by the provider computing device, wherein the a present availability status information includes at least a present availability status and a timestamp usable to identify a present date and time the present availability status was retrieved; identify a behavioral pattern of a plurality of behavioral patterns for the user as a function of the present availability status; determine a predicted availability status change event; and create a predicted availability status string based on the identified behavioral pattern.

In some embodiments, the one or more processors are further configured to execute the instructions to retrieve one or more present data references, wherein to identify the behavioral pattern comprises comparing the present availability status and one or more of the present data elements to a corresponding availability status and data elements of the behavioral pattern. In other embodiments, the one or more processors are further configured to execute the instructions to update the present availability status in the IM application to the predicted availability status string.

In other embodiments, to create the predicted availability status string comprises to (i) determine a predicted availability status, (ii) determine a predicted availability status update time, and (iii) concatenate text corresponding to the predicted availability status and the predicted availability status update time to form the predicted availability status string.

In some embodiments, the one or more processors are further configured to execute the instructions to receive an availability status update, wherein the availability status update indicates an availability status change by the user and includes availability status information; and create a behavioral pattern as a function of at least a portion of the availability status information, wherein the behavioral pattern includes at least a portion of the availability status information.

In other embodiments, the one or more processors are further configured to execute the instructions to assign a confidence level of the behavioral pattern. In still other embodiments, to assign the confidence level comprises to assign the confidence level as a function of a weighted value associated with one or more data elements of the availability status information.

In some embodiments, the availability status information includes a present availability status, a timestamp usable to identify a date and time the availability status update was performed by the user. In other embodiments, the one or more processors are further configured to execute the instructions to retrieve one or more $3^{rd}$ party references, wherein to create the behavioral pattern further comprises creating the behavioral pattern as a function of the one or more $3^{rd}$ party references. In still other embodiments, to retrieve the one or more $3^{rd}$ party references comprises retrieving the one or more $3^{rd}$ party references from at least one of a $3^{rd}$ party data aggregator, a local hardware resource of the provider computing device, or a software application of the provider computing device.

In some embodiments, the one or more processors are further configured to retrieve one or more $3^{rd}$ party references, wherein to identify the behavioral pattern of a plurality of behavioral patterns for the user further comprises to identify the behavioral pattern as a function of at least one of the one or more $3^{rd}$ party references. In still other embodiments, to retrieve the one or more $3^{rd}$ party references comprises to retrieve the one or more $3^{rd}$ party references from at least one of a $3^{rd}$ party data aggregator, a local hardware resource of the provider computing device, or a software application of the provider computing device.

BRIEF DESCRIPTION OF DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
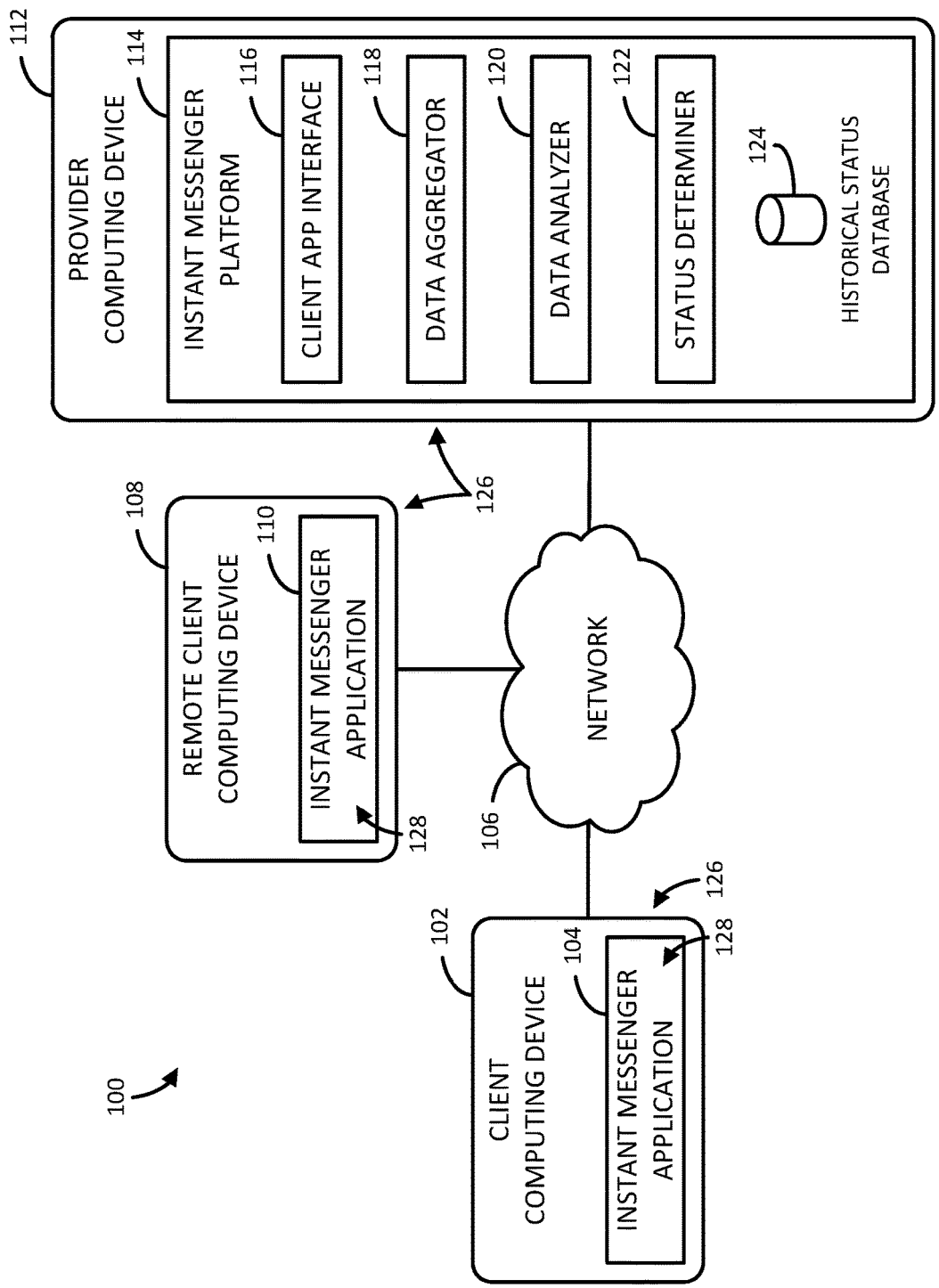
FIG. 1 is a simplified block diagram of at least one embodiment of a system for predicting availability status changes that includes a client computing device and a remote client computing device in a client-server architecture with a provider computing device.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 is an illustrative system 100 for predicting availability status changes for a user of an instant messenger (IM) service that includes a client computing device 102 and a remote client computing device 108 communicatively coupled to a provider computing device 112 via a network 106. In use, each of the client computing device 102 and the remote client computing device 108 may execute an IM service/application managed and provided by the provider computing device 112 (e.g., via the IM platform 114). Accordingly, in an illustrative example, a user of the client computing device 102 and another user of the remote client computing device 108 can communicate with each other in real time using an instance of the IM application 128 installed and presently executing on their associated client computing device (i.e., the IM application 104 of the client computing device 102 and the IM application 110 of the remote client computing device 108).

Additionally, in furtherance of the illustrative example, each user can see a present availability status of the other user. The availability status may include any textual and/or visual representation indicative of a present availability of the respective user. Typically, the availability status of present technologies includes a textual status and/or color designation that indicates whether a user is available or unavailable (e.g., away, busy, out of the office, in a meeting, on a call, inactive, offline, etc.). However, unlike such present technologies, the provider computing device 112, or more particularly the IM platform 114 of the provider computing device 112, is configured to analyze a present availability status and historical data associated with past availability statuses to predict a next availability status such that the present availability status can be updated to reflect the next availability status.

For example, the IM platform 114 may detect a present availability status of a user as indicating a particular availability status, but the IM platform 114 may predict that the availability status of the user is likely to change at a particular time in the future (i.e., as a result of an analysis of the historical data). Accordingly, the IM platform 114 can update the present availability status to include the predicted next availability status. As such, another user can reasonably determine whether a pending interaction with that user might be impacted by the next availability status at the anticipated time.

In an illustrative example, the IM platform 114 may detect a present availability status of a user at 8 AM on a Tuesday as unavailable (e.g., "Offline"), but historical analysis shows a high likelihood (i.e., a high confidence level relative to a threshold level) that the user will change their availability status to available (e.g., "Available") at around 8:15 AM. In other words, historically, the user has updated their status from offline to available at around 8:15 AM on Tuesdays a sufficient number of times that it can be reasonably inferred the user is likely to do so again. As such, the present availability status may be updated to reflect the predicted next availability status (e.g., "Offline, but usually available around 8:15 AM). In furtherance of the illustrative example, another user wanting to speak with that user on a particular topic may determine whether to wait until 8:15 AM for the user, send an email to the user concerning the topic, or speak with another person on the topic.

Each of the client computing device 102, the remote client computing device 108, and the provider computing device 112 may be embodied as any type of computing device 126 capable of performing the respective functions described herein. For example, the client computing device 102, the remote client computing device 108, and the provider computing device 112 may each be embodied as, but are not limited to, mobile computing devices, desktop computers, one or more servers (e.g., stand-alone, rack-mounted, etc.), compute devices, storage devices, and/or combination of compute blades and data storage devices (e.g., of a storage area network (SAN)) in a cloud architected network or data center.

Figure 2:
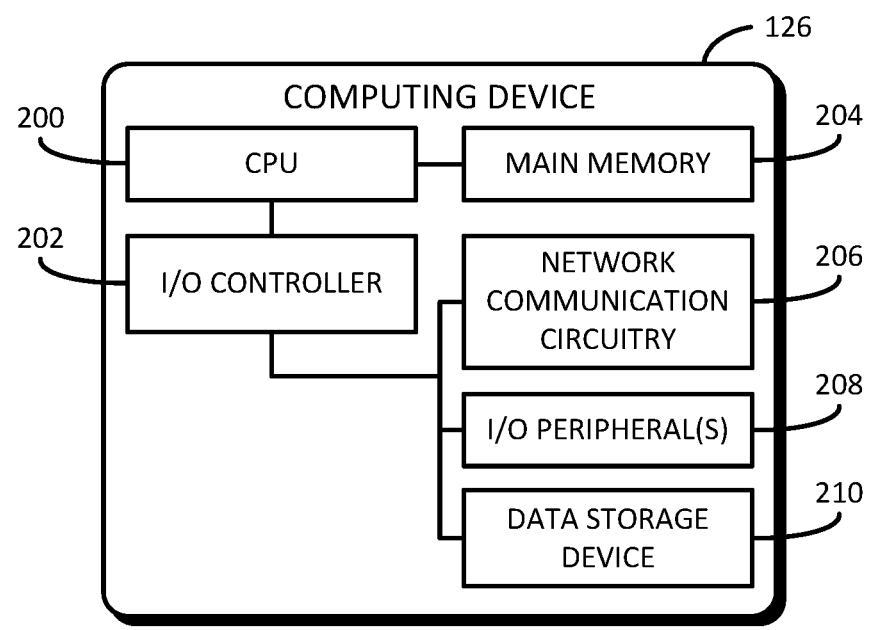
FIG. 2 is a simplified block diagram of at least one embodiment of the client computing devices and the provider computing device of the system of FIG. 1.

Referring now to FIG. 2, an illustrative computing device 126 (i.e., an illustrative embodiment of the client computing device 102, the remote client computing device 108, and/or the provider computing device 112) includes a central processing unit (CPU) 200, an input/output (I/O) controller 202, a main memory 204, network communication circuitry 206, one or more I/O peripherals 208, and a data storage device 210. In some alternative embodiments, the computing device 126 may include additional, fewer, and/or alternative components to those of the illustrative computing device 126, such as a graphics processing unit (GPU). It should be appreciated that one or more of the illustrative components may be combined on a single system-on-a-chip (SoC) on a single integrated circuit (IC).

Additionally, it should be appreciated that the type of components and/or hardware/software resources of the respective computing device 126 may be predicated upon the type and intended use of the respective computing device 126. It should be further appreciated that in such embodiments in which one of the computing devices 126 includes more than one computing device 126, one or more of the computing devices 126 may be configured as a database server with less compute capacity and more storage capacity relative to one or more of the other computing devices 126. Similarly, one or more other computing devices 126 may be configured as an application server with more compute capacity relative and less storage capacity relative to one or more of the other computing devices 126.

The CPU 200, or processor, may be embodied as any combination of hardware and circuitry capable of processing data. In some embodiments, the computing device 126 may include more than one CPU 200. Depending on the embodiment, the CPU 200 may include one processing core (not shown), such as in a single-core processor architecture, or multiple processing cores, such as in a multi-core processor architecture. Irrespective of the number of processing cores and CPUs 200, the CPU 200 is capable of reading and executing program instructions. In some embodiments, the CPU 200 may include cache memory (not shown) that may be integrated directly with the CPU 200 or placed on a separate chip with a separate interconnect to the CPU 200. It should be appreciated that, in some embodiments, pipeline logic may be used to perform software and/or hardware operations (e.g., network traffic processing operations), rather than commands issued to/from the CPU 200.

The I/O controller 202, or I/O interface, may be embodied as any type of computer hardware or combination of circuitry capable of interfacing between input/output devices and the computing device 126. Illustratively, the I/O controller 202 is configured to receive input/output requests from the CPU 200, and send control signals to the respective input/output devices, thereby managing the data flow to/from the computing device 126.

The memory 204 may be embodied as any type of computer hardware or combination of circuitry capable of holding data and instructions for processing. Such memory 204 may be referred to as main or primary memory. It should be appreciated that, in some embodiments, one or more components of the computing device 126 may have direct access to memory, such that certain data may be stored via direct memory access (DMA) independently of the CPU 200.

The network communication circuitry 206 may be embodied as any type of computer hardware or combination of circuitry capable of managing network interfacing communications (e.g., messages, datagrams, packets, etc.) via wireless and/or wired communication modes. Accordingly, in some embodiments, the network communication circuitry 206 may include a network interface controller (NIC) capable of being configured to connect the computing device 126 to a computer network, as well as other devices, depending on the embodiment.

The one or more I/O peripherals 208 may be embodied as any auxiliary device configured to connect to and communicate with the computing device 126. For example, the I/O peripherals 208 may include, but are not limited to, a mouse, a keyboard, a monitor, a touchscreen, a printer, a scanner, a microphone, a speaker, etc. Accordingly, it should be appreciated that some I/O devices are capable of one function (i.e., input or output), or both functions (i.e., input and output). The illustrative I/O peripherals 208 includes a display, which may be embodied as a touchscreen display capable of receiving user input via touch (e.g., one or more fingers, a stylus, etc.).

In some embodiments, the I/O peripherals 208 may be connected to the computing device 126 via a cable (e.g., a ribbon cable, a wire, a universal serial bus (USB) cable, a high-definition multimedia interface (HDMI) cable, etc.) of the computing device 126. In such embodiments, the cable may be connected to a corresponding port (not shown) of the computing device 126 for which the communications made therebetween can be managed by the I/O controller 202. In alternative embodiments, the I/O peripherals 208 may be connected to the computing device 126 via a wireless mode of communication (e.g., Bluetooth®, Wi-Fi®, etc.) which can be managed by the network communication circuitry 206.

The data storage device 210 may be embodied as any type of computer hardware capable of the non-volatile storage of data (e.g., semiconductor storage media, magnetic storage media, optical storage media, etc.). Such data storage devices 210 are commonly referred to as auxiliary or secondary storage, and are typically used to store a large amount of data relative to the memory 204 described above.

Referring back to FIG. 1, while the provider computing device 112 is illustrated as a single computing device 126, it should be appreciated that, in some embodiments, the provider computing device 112 may include more than one computing device 126 (e.g., in a distributed computing architecture), each of which may be usable to perform at least a portion of the functions described herein of the provider computing device 112. In other words, in some embodiments, the IM application instances 128 may be executed on the respective client computing device 102, 108, while the IM platform 114 may be executed on one or more provider computing devices 112.

In an illustrative example, the client computing device 102 and/or the remote client computing device 108 may be embodied as a desktop computer or a mobile computing device, such as a smartphone, wearable (e.g., smartwatch, smart glasses, etc.), tablet, laptop, etc). In furtherance of the illustrative example, the provider computing device 112 may be embodied as one or more servers on which the server-side implementation of the IM application instances 128 (i.e., the instant messenger platform 114) is housed. Accordingly, it should be appreciated that the client computing devices 102, 108 may include different hardware and/or software technologies than the provider computing device(s) 112.

Each of the illustrative client computing device 102 and client computing device 108 includes an IM application instance 128 (i.e., the IM application 104 of the client computing device 102 and the IM application 110 of the remote client computing device 108). As described previously, each IM application instance 128 is configured to serve as a software-based interface between users to provide text- and/or graphic-based communications between the users (i.e., by way of the IM platform 114). Accordingly, the IM application instances 128 may be embodied as any type of network-based software application (e.g., thick client, thin/zero client, cloud application, network application, software-as-a-service (SaaS) application, etc.) configured to communicate with the provider computing device 112 in a client-server relationship over the network 106. Additionally, it should be appreciated that each of the IM application instances 128 may include a graphical user interface (GUI) (not shown), such that the users can interface with their respective IM application instance 128 to provide input and update their respective availability status.

The network 106 may be implemented as any type of wired and/or wireless network, including a local area network (LAN), a wide area network (WAN), a global network (the Internet), etc. Accordingly, the network 116 may include one or more communicatively coupled network computing devices (not shown) for facilitating the flow and/or processing of network communication traffic via a series of wired and/or wireless interconnects. Such network computing devices may include, but are not limited, to one or more access points, routers, switches, servers, compute devices, storage devices, etc.

As described previously, the illustrative provider computing device 112 includes the IM platform 114. The IM platform 114 may be embodied as any combination of hardware, firmware, software, or circuitry usable to perform the functions described herein. While the IM platform 114 is described herein as a stand-alone application, it should be appreciated that, in some embodiments, the IM platform 114 may form a portion of or otherwise be integrated with another service and/or platform (e.g., in an enterprise software suite).

The illustrative IM platform 114 includes a client application interface 116, a data aggregator 118, a data analyzer 120, and a status determiner 122, each of which may be embodied as any type of firmware, hardware, software, circuitry, or combination thereof that is configured to perform the functions described herein. In some embodiments, one or more of the client application interface 116, the data aggregator 118, the data analyzer 120, and the status determiner 122 may include one or more computer-readable medium (e.g., the memory 204, the data storage device 210, and/or any other media storage device) having instructions stored thereon and one or more processors (e.g., the CPU 200) coupled with the one or more computer-readable medium and configured to execute instructions to perform the functions described herein.

The client application interface 116, which may be embodied as any type of firmware, hardware, software, circuitry, or combination thereof, is configured to provide a client interface to the IM application instances 128. To do so, the client application interface 116 may be configured to provide one or more objects usable to render one or more GUI elements to each of the IM application instances 128. Additionally, the client application interface 116 is configured to provide at least a portion of the IM service functionality across the IM application instances 128. For example, the client application interface 116 is configured to receive and transmit instructions usable by the appropriate instance(s) of the IM application instances 128 to facilitate the communications therebetween, as well as perform other functions, such as update the availability statuses.

The data aggregator 118, which may be embodied as any type of firmware, hardware, software, circuitry, or combination thereof, is configured to receive data updates from the IM application instances 128, such as the updates to the availability status (i.e., availability status updates). For example, if a user of a particular IM application instance 128 changes their availability status, that particular IM application instance 128 is configured to transmit a message to the data aggregator 118 that includes information related to the availability status change (i.e., status change information). The status change information may include any information that is associated with the availability status at the time the availability status was changed, such as a date, a time, a text string or enumeration associated with the updated availability status, etc.

In some embodiments, the data aggregator 118 may be configured to retrieve at least a portion of the status change information and/or reference data from local hardware and/or software resources to determine such status change information, as well. For example, the data aggregator 118 may retrieve a timestamp from a hardware or software resource of the provider computing device 112 that is usable to identify the time/date at which the status change information was received. In some embodiments, at least a portion of the status change information may be stored in the historical status database 124.

The data aggregator 118 is additionally configured to retrieve reference data from 3rd party sources (e.g., 3rd party data aggregators, applications, services, etc.) that is usable to normalize, refine, and/or enhance the received updated availability status. In other words, while the status change information is described herein as being collected from the IM application instances 128, additional and/or alternative data may be retrieved from a source other than the IM application instances 128 (e.g., via an API of a 3rd party data), such that the externally retrieved data references may be usable to refine and/or enhance the status change information. For example, the 3rd party source may include a weather data aggregator, a traffic data aggregator, a calendar application, a map application, a time zone application, etc. Accordingly, in some embodiments, at least a portion of the 3rd party retrieved data may be stored in the historical status database 124.

The data analyzer 120, which may be embodied as any type of firmware, hardware, software, circuitry, or combination thereof, is configured to analyze the aggregated historical availability status change information and the 3rd party retrieved data (i.e., the historical data set) to determine a set of behavioral patterns. The behavioral patterns may include any combination of historical status change information and 3rd party retrieved data that is usable to predict an availability status change for a particular user, such as user identifying information, an availability status pre- and post-update of the availability status, a day of the week, a time of day, a location, a time zone, a number of times that the availability status changed (i.e., a count), as well as other usable information, such as the weather, traffic, etc., pre-update of the availability status change. In some embodiments, the behavioral patterns may be stored in the historical status database 124.

In some embodiments, the data analyzer 120 may be additionally configured to determine a confidence level of each behavioral pattern (i.e., a behavioral pattern confidence level). In such embodiments, the confidence level may be may be defined as any numerical value (e.g., amount, quantity, counter value, percentage, etc.) usable to convey a level of confidence in the behavioral pattern. For example, a behavioral pattern that is only based on fewer availability status change occurrences relative to another behavioral pattern may have a lower threshold that the other behavioral pattern. In some embodiments, one or more data elements of the behavioral pattern may be weighted relative to the other data elements of the behavioral pattern. Accordingly, in such embodiments, one behavioral pattern may have a higher level of confidence than another behavioral pattern that has occurred more frequently based on a weight attributed to a particular data element shared by both of the behavioral patterns.

The status determiner 122, which may be embodied as any type of firmware, hardware, software, circuitry, or combination thereof, is configured to analyze a present availability status and any current externally retrieved data references (i.e., a present data set) against one or more behavioral patterns. To do so, the status determiner 122 is configured to identify any behavioral patterns as a function of the present data set. To identify the behavioral pattern(s), the status determiner 122 is configured to use one or more elements of the present data set (e.g., day of the week, time of day, the present availability status, etc.) usable to identify any associated behavioral patterns.

Additionally, in some embodiments, the status determiner 122 may be configured to compare the behavioral pattern confidence level for each of the identified behavioral patterns to a behavioral pattern confidence threshold to determine whether a particular predicted availability status should be used. As described previously, the behavioral pattern confidence level (e.g., as may be determined by the data analyzer 120) may be any numerical value (e.g., amount, quantity, counter value, percentage, etc.) usable to convey a level of confidence in the behavioral pattern. Accordingly, the behavioral pattern confidence threshold may be defined as any corresponding amount usable to compare against the behavioral pattern confidence level to determine whether the confidence level is high enough such that a particular predicted availability status should be used. It should be appreciated that if more than one behavior pattern meets or exceeds the behavioral pattern confidence threshold, the status determiner 122 may rely on a tiebreaker (e.g., a weight of a shared data element, the highest behavioral pattern confidence level, etc.).

In an illustrative example, the data analyzer 120 may analyze the historical data and generate one behavioral pattern that indicates on non-holiday Tuesdays with normal weather conditions and normal traffic patterns, J. Doe changes their availability status from "Offline" to "Available" between 8:10 AM EST and 8:20 AM EST. Additionally, the data analyzer 120 may analyze the historical data and generate another behavioral pattern that indicates on non-holiday workweek days with 2-hour school delays and normal traffic patterns, J. Doe changes their availability status from "Offline" to "Available" between 10:10 AM EST and 10:20 AM EST.

Accordingly, in furtherance of the illustrative example, the status determiner 122 may identify the two illustrative behavioral patterns as being relevant as a result of the status determiner 122 having determined the present availability status of J. Doe on this non-holiday Tuesday as being "Offline" at 7:30 AM EST. Further, the status determiner 122 may determine that there are not presently any school delays in effect that might otherwise affect J. Doe's anticipated availability status change. As such, the status determiner 122 may be configured to apply the first behavioral pattern to the present availability status. In other words, the status determiner 122 may change the availability status for J. Doe from "Offline" to "Offline, but typically available between 8:10 AM EST and 8:20 AM EST."

Figure 3:
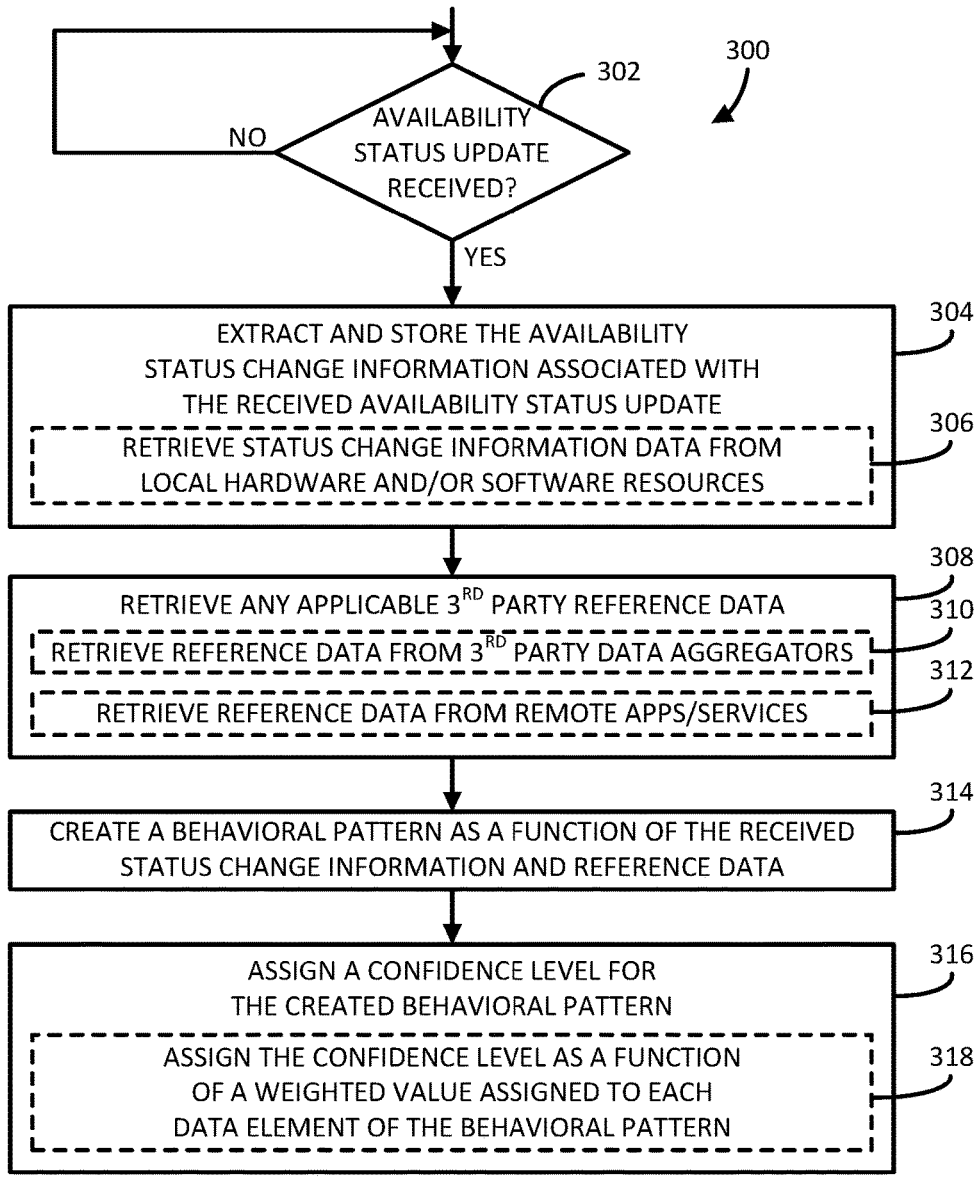
FIG. 3 is a simplified flow diagram of at least one embodiment of a method for creating a behavioral pattern that may be executed by the provider computing device of FIG. 1.

Referring now to FIG. 3, an illustrative method 300 is provided for creating a behavioral pattern that may be executed by the provider computing device 112, or more particularly by the IM platform 114 of the provider computing device 112. In other words, one or more of the operations of the illustrative method 300 as described herein may be performed by one or more components of the IM platform 114, such as those components illustratively shown in FIGS. 1 and 2 described above. The method 300 begins in block 302, in which the IM platform 114 determines whether an availability status update has been received (i.e., from an IM application instance 128 of FIG. 1). As described previously, the availability status update is triggered by a user when they change their availability status setting in their respective IM application instance 128.

If an availability status update was received, the method 300 advances to block 304, in which the IM platform 114 extracts and stores the availability status change information associated with the received availability status update. As described previously, the received availability status update may include information associated with the availability status change at the time the availability status was changed (i.e., the status change information), including, but not limited to, a date, a time, a text string or enumeration associated with the updated availability status, etc. Additionally or alternatively, in some embodiments, in block 306, the IM platform 114 may be configured to retrieve at least a portion of the status change information from local hardware (e.g., a hardware/CMOS clock) and/or software resources (e.g., a clock application, a calendar application, etc.) of the provider computing device 112.

In block 308, the IM platform 114 retrieves any applicable 3rd party reference data. To do so, in some embodiments, in block 310, the IM platform 114 retrieves reference data from one or more 3rd party data aggregators (e.g., weather data aggregators, traffic data aggregators, etc.). Additionally or alternatively, in some embodiments, in block 312, the IM platform 114 retrieves reference data from one or more remote applications/services, such as cloud applications, network applications, software-as-a-service (SaaS) applications, etc.

In block 314, the IM platform 114 creates a behavioral pattern as a function of the received status change information and retrieved reference data (e.g., retrieve from local resources and/or remote resources). As described previously, the behavioral patterns may include any combination of historical status change information and 3rd party retrieved data that is usable to predict an availability status change for a particular user, such as user identifying information, an availability status pre- and post-update of the availability status, a day of the week, a time of day, a location, a time zone, a number of times that the availability status changed (i.e., a count), as well as other usable information, such as the weather, traffic, etc., pre-update of the availability status change. It should be appreciated that the present behavioral pattern may shares a number of similar characteristics with an existing behavioral pattern. Under such conditions, the IM platform 114 may update the existing behavioral pattern (e.g., increment a counter associated with each like data elements, replace existing data, supplement existing data, etc.).

In block 316, the IM platform 114 assigns a confidence level for the created behavioral pattern. To do so, in some embodiments, in block 318, the IM platform 114 may assign the confidence level to the behavioral pattern create in block 314 as a function of a weighted value assigned to one or more data elements of the behavioral pattern. It should be appreciated that, under certain conditions, the IM platform 114 may have updated an existing behavioral pattern in block 314. Accordingly, under such conditions, the IM platform 114 may update a previously assigned confidence level. In an illustrative example, if one or more data elements are consistent across the behavioral patterns, the IM platform 114 may be configured to increment a counter associated with the respective data elements, which may result in the IM platform 114 increasing the assigned confidence level from the previous level to a higher confidence level, which may depend on whether a weight has been assigned thereto. Similarly, if one or more data elements are different across the behavioral patterns, the IM platform 114 may be configured to decrease the assigned confidence level.

Figure 4:
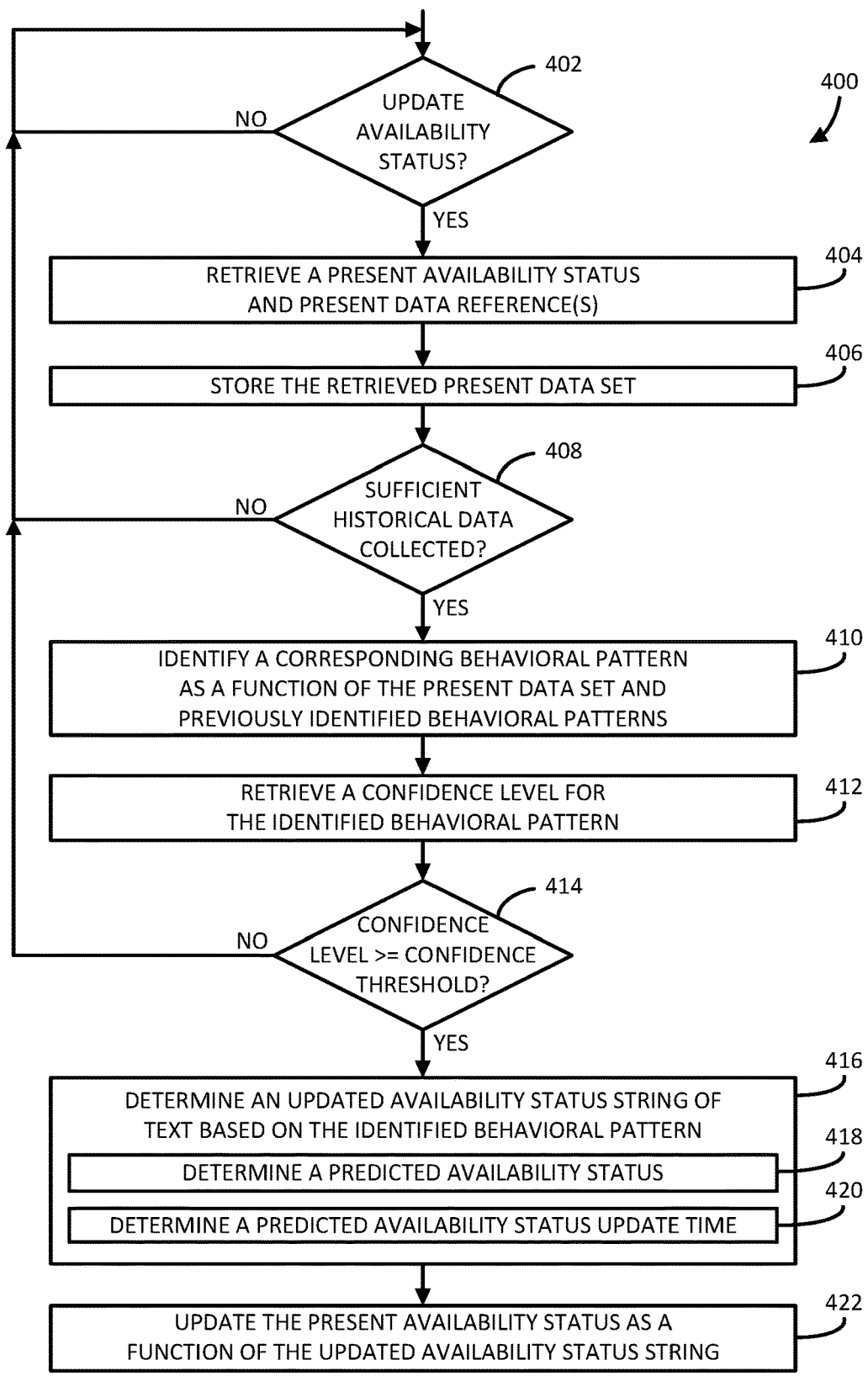
FIG. 4 is a simplified flow diagram of at least one embodiment of a method for predicting availability status changes that may be executed by the provider computing device of FIG. 1.

Referring now to FIG. 4, an illustrative method 400 is provided for predicting availability status changes that may be executed by the provider computing device 112, or more particularly by the IM platform 114 of the provider computing device 112. In other words, one or more of the operations of the illustrative method 400 as described herein may be performed by one or more components of the IM platform 114, such as those components illustratively shown in FIGS. 1 and 2 described above. It should be appreciated that the method 400 may be triggered by a timing mechanism, may be event driven, and/or may be triggered by any other implementation that may be utilized to initiate the operations of the method 400 as described herein. The method 400 begins in block 402, in which the IM platform 114 determines whether to update the availability status of a particular user (i.e., a user of an IM application instance 128 of FIG. 1). If so, the method 400 advances to block 404.

In block 404, the IM platform 114 retrieves a present availability status and any present data references (i.e., the present data set). As described previously, the availability status includes a text string that is usable to identify whether a user of the IM application instance 128 is presently available or unavailable (e.g., away, busy, out of the office, in a meeting, on a call, inactive, offline, etc.). The present data references may include a present date, time, location of a user (e.g., geographical location, time zone, etc.), as well as any external data references. As described previously, the external data references may include any data collected, received, or retrieved from a source external to the IM application (e.g., 3rd party data aggregator, remote application/service, local hardware/software resource, etc.).

In block 406, the IM platform 114 stores the present data set (e.g., in the historical status database 124), such that the present data set may be aggregated with the previously captured historical data for future analysis. In block 408, the IM platform 114 determines whether a sufficient amount of historical data has been collected to have determined one or more behavioral patterns that may be analyzed against the present data set. If not, the method 400 returns to block 402; otherwise, the method 400 advances to block 410, in which the IM platform 114 identifies a corresponding behavioral pattern as a function of at least a portion of the present data set and a number of previously identified behavioral patterns.

In block 412, the IM platform 114 retrieves a confidence level for the identified behavioral pattern. As described previously, the behavioral pattern confidence level may be any numerical value (e.g., amount, quantity, counter value, percentage, etc.) usable to convey a level of confidence in the behavioral pattern. In block 414, the IM platform 114 determines whether the behavioral pattern confidence level is greater than or equal to a behavioral pattern confidence threshold. If not, the method 400 returns to block 402; otherwise, the method 400 advances to block 416.

In block 416, the IM platform 114 determines a predicted availability status string (i.e., a text string) based on the identified behavioral pattern. To generate the predicted availability status string, in block 418, the IM platform 114 determines a predicted availability status and, in block 420, the IM platform 114 determines a predicted availability status update time. In block 422, the IM platform 114 updates the present availability status as a function of the updated availability status string, such as by transmitting a notification message to a corresponding IM application instance 128 that includes the string or an object directing the IM application instance 128 thereto.

In an illustrative example in which a user's present availability status is set to "Available" at 1:00 PM EST and the user has a meeting scheduled for 1:30 PM EST, the IM platform 114 may determine (i.e., based on a behavioral pattern) that the user typically changes their availability status to "In a meeting" roughly 15 minutes prior to most meetings. Accordingly, the IM platform 114 may determine the predicted availability status update time would be 1:15

PM EST, despite the meeting being scheduled for 1:30 PM EST. Under such conditions, the predicted availability status string may be updated at 1:15 PM EST to "Available, but likely unavailable at 1:15 PM EST." Accordingly, another user at another IM application instance 128 may be prompted to speak to the user sooner rather than later, knowing that the user is more likely than not going to be unavailable in the next 15 minutes.

While the present disclosure has been illustrated and described in detail in the drawings and foregoing description, the same is to be considered as illustrative and not restrictive in character, it being understood that only certain embodiments have been shown and described, and that all changes and modifications that come within the spirit of the present disclosure are desired to be protected.

What is claimed is:

1. A method for predicting availability status changes, the method comprising:
   retrieving, via a provider computing device, present availability status information for a user of an instant messenger (IM) application managed by the provider computing device, wherein the present availability status information includes at least a present availability status and a timestamp usable to identify a present date and time the present availability status was retrieved;
   identifying, by the provider computing device, a behavioral pattern of a plurality of behavioral patterns for the user as a function of the present availability status;
   determining, by the provider computing device, a predicted next availability status information based on the identified behavioral pattern for the user, wherein the predicted next availability status information includes at least a predicted availability status change event and a timestamp useable to identify a next date and time of the availability status; and
   creating, by the provider computing device, a predicted availability status string based on the predicted next availability status information.

2. The method of claim 1, further comprising retrieving, by the provider computing device, one or more present data references, wherein identifying the behavioral pattern comprises comparing the present availability status and one or more of the present data elements to a corresponding availability status and data elements of the behavioral pattern.

3. The method of claim 1, further comprising updating, by the provider computing device, the present availability status in the IM application to the predicted availability status string.

4. The method of claim 1, wherein creating the predicted availability status string comprises (i) determining a predicted availability status, (ii) determining a predicted availability status update time, and (iii) concatenating text Corresponding to the predicted availability status and the predicted availability status update time to form the predicted availability status string.

5. The method of claim 1, further comprising:
   receiving, by the provider computing device, an availability status update, wherein the availability status update indicates an availability status change by the user and includes availability status information; and
   creating, by the provider computing device, a behavioral pattern as a function of at least a portion of the availability status information, wherein the behavioral pattern includes at least a portion of the availability status information.

6. The method of claim 5, further comprising assigning, by the provider computing device, a confidence level of the behavioral pattern.

7. The method of claim 6, wherein assigning the confidence level comprises assigning the confidence level as a function of a weighted value associated with one or more data elements of the availability status information.

8. The method of claim 5, wherein the availability status information includes a present availability status, a timestamp usable to identify a date and time the availability status update was performed by the user.

9. The method of claim 5, further comprising retrieving, by the provider computing device, one or more 3rd party references, wherein creating the behavioral pattern further comprises creating the behavioral pattern as a function of the one or more 3rd party references.

10. The method of claim 9, wherein retrieving the one or more 3rd party references comprises retrieving the one or more 3rd party references from at least one of a 3rd party data aggregator, a local hardware resource of the provider computing device, or a software application of the provider computing device.

11. The method of claim 1, further comprising retrieving, by the provider computing device, one or more 3rd party references, wherein identifying the behavioral pattern of the plurality of behavioral patterns for the user further comprises identifying the behavioral pattern as a function of at least one of the one or more 3rd party references.

12. The method of claim 11, wherein retrieving the one or more 3rd party references comprises retrieving the one or more 3rd party references from at least one of a 3rd party data aggregator, a local hardware resource of the provider computing device, or a software application of the provider computing device.

13. A provider computing device for predicting availability status changes, the provider computing device comprising:
   one or more computer-readable media comprising instructions; and one or more processors coupled with the one or more computer-readable media and configured to execute the instructions to:
   retrieve a present availability status information for a user of an instant messenger (IM) application managed by the provider computing device, wherein the present availability status information includes at least a present availability status and a timestamp usable to identify a present date and time the present availability status was retrieved;
   identify a behavioral pattern of a plurality of behavioral patterns for the user as a function of the present availability status;
   determine a predicted next availability status information based on the identified behavioral pattern for the user, wherein the predicted next availability status information includes at least a predicted availability status change event and a timestamp useable to identify a next date and time of the availability status; and
   create a predicted availability status string based on the predicted next availability status information.

14. The provider computing device of claim 13, wherein the one or more processors are further configured to execute the instructions to retrieve one or more present data references, wherein to identify the behavioral pattern comprises comparing the present availability status and one or more of the present data elements to a corresponding availability status and data elements of the behavioral pattern.

15. The provider computing device of claim 13, wherein the one or more processors are further configured to execute the instructions to update the present availability status in the IM application to the predicted availability status string.

16. The provider computing device of claim 13, wherein to create the predicted availability status string comprises to (i) determine a predicted availability status, (ii) determine a predicted availability status update time, and (iii) concatenate text corresponding to the predicted availability status and the predicted availability status update time to form the predicted availability status string.

17. The provider computing device of claim 13, wherein the one or more processors are further configured to execute the instructions to:
  receive an availability status update, wherein the availability status update indicates an availability status change by the user and includes availability status information; and
  create a behavioral pattern as a function of at least a portion of the availability status information, wherein the behavioral pattern includes at least a portion of the availability status information.

18. The provider computing device of claim 17, wherein the one or more processors are further configured to execute the instructions to assign a confidence level of the behavioral pattern.

19. The provider computing device of claim 18, wherein to assign the confidence level comprises to assign the confidence level as a function of a weighted value associated with one or more data elements of the availability status information.

20. The provider computing device of claim 16, wherein the availability status information includes a present availability status, a timestamp usable to identify a date and time the availability status update was performed by the user.

21. The provider computing device of claim 16, wherein the one or more processors are further configured to execute the instructions to retrieve one or more 3rd party references, wherein to create the behavioral pattern further comprises creating the behavioral pattern as a function of the one or more 3rd party references.

22. The provider computing device of claim 21, wherein to retrieve the one or more 3rd party references comprises retrieving the one or more 3rd party references from at least one of a 3rd party data aggregator, a local hardware resource of the provider computing device, or a software application of the provider computing device.

23. The provider computing device of claim 13, wherein the one or more processors are further configured to retrieve one or more 3rd party references, wherein to identify the behavioral pattern of the plurality of behavioral patterns for the user further comprises to identify the behavioral pattern as a function of at least one of the one or more 3rd party references.

24. The provider computing device of claim 23, wherein to retrieve the one or more 3rd party references comprises to retrieve the one or more 3rd party references from at least one of a 3rd party data aggregator, a local hardware resource of the provider computing device, or a software application of the provider computing device.

* * * * *